United States Patent [19]

Warren

[11] Patent Number: 4,804,528

[45] Date of Patent: Feb. 14, 1989

[54] STRIPPING AND RECOVERY OF DICHROMATE IN ELECTROLYTIC CHLORATE SYSTEMS

[75] Inventor: Ian H. Warren, Richmond, Canada

[73] Assignee: C-I-L Inc., North York, Canada

[21] Appl. No.: 142,958

[22] Filed: Jan. 12, 1988

[51] Int. Cl.$^4$ .............................................. C01G 37/00
[52] U.S. Cl. ...................................... 423/607; 423/56; 204/51; 204/DIG. 13; 204/97; 210/720; 210/913
[58] Field of Search ............................... 210/720, 913; 204/DIG. 13, 51, 97; 423/607, 56

[56] References Cited

U.S. PATENT DOCUMENTS

| | | | |
|---|---|---|---|
| 3,843,769 | 11/1974 | Partridge et al. | 210/913 |
| 4,259,297 | 3/1981 | Kaczur et al. | 423/607 |
| 4,477,318 | 10/1984 | Tomaszewski | 423/607 |
| 4,560,546 | 12/1985 | Perrone et al. | 423/607 |
| 4,680,126 | 7/1987 | Frankard et al. | 204/DIG. 13 |

FOREIGN PATENT DOCUMENTS

| | | | |
|---|---|---|---|
| 0021508 | 2/1980 | Japan | 423/607 |
| 218495 | 3/1964 | Sweden | 423/607 |

*Primary Examiner*—Robert L. Stoll
*Attorney, Agent, or Firm*—C. Brian Barlow

[57] ABSTRACT

A process for removing dichromates from chlorate-rich solutions containing hypochlorite and dichromate ions and produced by the electrolysis of brine. The dichromate is reduced in a two-stage process by the addition of ammonia under controlled conditions of pH and temperature to a mixed di- and trivalent chromium hydroxide which is precipitated from solution and removed. The process provides an economical method of recovering chromium from electrolytically produced chlorate solutions.

5 Claims, No Drawings

STRIPPING AND RECOVERY OF DICHROMATE IN ELECTROLYTIC CHLORATE SYSTEMS

This invention relates to a process for the removal of dichromates from alkali metal chlorates solutions electrolytically produced from alkali metal chloride.

Chlorine dioxide is used extensively for the bleaching of pulp and is generally prepared by the reaction of an aqueous solution of sodium chlorate with an acid, typically, sulphuric acid. The solution of sodium chlorate is generally prepared by the electrolysis of sodium chloride. In the electrolytic process, sodium chloride is electrolyzed to produce chlorine, sodium hydroxide and hydrogen. The chlorine and sodium hydroxide are immediately reacted to form sodium hypochlorite which is then converted to sodium chlorate under controlled conditions of pH and temperature.

After leaving the electrolysis section of the plant the liquor, which contains residual quantities of sodium hypochlorite, is commonly treated to remove this hypochlorite which renders the solution corrosive. Hypochlorite removal processes used commercially generally involve reaction with ammonia as described in Canadian Patent No. 1,112,845, sodium sulphite or hydrogen peroxide.

A small portion of chromium, usually in the form of dichromate, typically, sodium dichromate, is added to the electrolyte to prevent loss of current efficiency at the cathode. The dichromate is not consumed by the process and leaves with the sodium chlorate/sodium chloride solution. However, sodium dichromate is an expensive chemical which leaves in the product solution and thus represents an economic loss. In addition, the chromium is not consumed in the downstream chlorine dioxide process and enters the environment via the pulping process.

Numerous processes have been developed for the removal of dichromates from plating baths and other metal treatment solutions. Chloride ion is, typically, absent from these metal treatment solutions and very low levels of dissolved chromium can be achieved by reduction of the chromium from the hexavalent to the trivalent state, followed by its precipitation as hydrated chromic oxide. Unfortunately, the hydrated chromic oxide compound has a solubility product higher by a factor of $10^5$ when in choride-containing solutions and that the chlorate liquor to be treated from an electrolytic plant typically has a chloride content of approximately 100 g/lNaCl.

In order to achieve low levels of chromium significantly less than 10 parts per million in the reductive treatment of electrolytic chlorate solutions it has been found necessary to reduce at least some of the chromium beyond the $Cr^{3+}$ state. In Canadian Patent No. 1,187,036 in the name of Olin Corporation, there is described a process for the production of a precipitate believed to be $Cr(OH)_2$, (reduction beyond the $Cr(OH)_3$ compound can be readily seen by a change of precipitate colour from green to bright blue-green) leaving a filtrate containing less than 0.01 parts per million of chromium. In the supplementary addition to Canadian Patent No. 1,139,080 to Chemetics International the composition of the characteristic blue-green precipitate is described as typically having an O/Cr ratio of between 1.3 and 1.4. Thus, the hydrated oxide precipitate approximates the formula $Cr_3O_4 \times H_2O$, containing 2 moles of $Cr^{3+}+1$ mole of $Cr^{2+}$ per formula mole of the compound.

It is generally accepted that the ideal chromium removal process should be capable of lowering chromium levels to less than 1 ppm in solution, should use a cheap non-toxic reductant, and produce a chromium compound that could be recycled directly to the chlorate production process.

Hydrazine and hydroxylamine are both capable of yielding typically blue-green precipitates of chromium from chlorate solutions and have been patented as chromium removal methods (Canadian Patent No. 1,119,772, Canadian Patent No. 1,139,080 and Swedish Patent No. 218,495). However, these chemicals are expensive and hydrazine presents some toxicity problems to the handlers.

Many patents refer to chromium removal from plating solutions and the like but are deemed to be not truly pertinent to the present invention. There are, however, patents which refer to methods for the removal of chromium from chlorate-containing solutions.

U.S. Pat. No. 3,616,344 describes a process wherein an alkali metal chlorate used for electrochemical machining is treated with a ferrous salt or an alkali metal or ammonium sulphite, or a stannous salt, to reduce hexavalent chrome the trivalent chrome hydroxide which precipitates from solution. Alternatively a soluble salt of divalent lead, zinc, cobalt or copper is used to remove chromate ions as insoluble chromate.

U.S. Pat. No. 4,086,150 describes a process for removing chromates from alkali metal chlorate solutions by adding a water soluble sulphide, followed by a ferrous salt. An insoluble trivalent chromium material is separated. Alternatively an "iron mud" is used to precipitate insoluble trivalent chromium containing materials.

As described in Canadian Patent No. 1,112,845 ammonia may be used to destroy hypochlorite via the production of chloramines at a pH in the region of 6.75. At this pH the mono- and dichloramines produced are believed to rapidly interact with their mutual destruction and production of nitrogen. When ammonia reacts with the hypochlorite above pH 8.5 only monochloramine is formed (Re. Corbett et. al. J. (1953) pp. 1927–1929) and it has been known for many years that this compound reacts with excess ammonia to produce hydrazine. However, the hydrazine producing reaction is known to be very sensitive to the presence of traces of metal impurities and thus very pure solutions have to be used in its commercial production and large amounts of gelatine added to obtain the compound. (See Hydrazine & Its Derivatives, Preparation, Properties & Applications. E. Schmidt. John Wiley & Sons (1984)).

U.S. Pat. No. 4,268,486 describes a process for removing chromates from alkali metal chlorate solutions by reaction with a hydrazine compound and separating the trivalent chromium compound from the solution.

Many of the above processes, if applied to the electrolytic production of alkali metal chlorates, would add undesired chemical impurities to the product solution or do not allow recovery of the separated chromium within the electrolytic process. Those processes directly applicable to alkali metal chlorate production have not proven to be economical. The process of U.S. Pat. No. 4,268,486 utilizes hydrazine, an expensive and toxic chemical whilst that of the U.S. Pat. No. 4,335,000, utilizing ion exchange resins, requires close control of the liquor pH under acidic conditions to prevent the liberation of chlorine dioxide and chlorine. Also processes which utilize reduction of chromium only to the 3+ state are not adequate for obtaining low chromium levels in chloride-containing solutions.

Thus, a process is required which will economically recover chromium from solutions of sodium chlorate and sodium chloride and, optionally, allows recycle to the electrolytic section of the sodium chlorate process for reuse.

It is therefore an object of this invention to provide an improved method of removing dichromates from chlorate-rich alkali metal chlorate-chloride solutions produced by electrolysis wherein the chromium is removed from the aqueous solutions to very low levels without the addition of expensive or hazardous chemicals.

It is a further object of the invention to provide a method which not only results in successful stripping of chromium from chlorate-rich solutions in relatively inexpensive equipment, but also, optionally, permits the recycling of the "clean" precipitated chromium hydroxide to the chlorate production process.

It is a yet further object of this invention that no undesirable impurities need be introduced into the mother liquor and that the composition of the chlorate-chloride treated solution in regards to major components is unchanged, i.e. the chlorate and chloride concentrations are constant.

These and additional objects will appear hereinafter.

Surprisingly, we have now found that when ammonia and a small amount of alkali to elevate the pH to above pH 8.5 are added to a typical electrolytic dichromate-chlorate liquor containing residual hypochlorite from the production process and the resulting solution maintained at a temperature greater than 60° C., reduction of the hexavalent chromium occurs to produce a green solution containing a greenish precipitate. Upon removal of the excess ammonia and lowering of the pH below 8.5, reduction of the chromium proceeds further with the eventual production of a blue-green precipitate and substantially complete removal of the chromium from solution.

Thus, according to the invention there is provided an improved process for the removal of dichromate from a solution containing chlorate, hypochlorite and dichromate ions of the type comprising reducing the hexavalent chromium of said dichromate to mixed di- and trivalent chromium in the form of a hydroxide precipitate which improvement comprises effecting said reduction in two stages comprising:

(a) treating said solution at a pH greater than 8.5 at a temperature of greater than 60° C. with ammonia to effect production of said hydroxide precipitate; said ammonium and said hypochlorite being present in sufficiently excessive amounts to permit the production of said hydroxide precipitate; and (b) adjusting the pH of the resultant solution to below 8.5 at a temperature of greater than 40° C. to effect substantially complete precipitation of said di- and trivalent chromium hydroxide.

Any aqueous solution of alkali metal chlorate which contains reducible hexavalent chromium ions may be treated according to the process of this invention. Typical alkali metal chlorate solutions include sodium chlorate, potassium chlorate and mixtures thereof.

In the general procedure according to the invention ammonia and alkali are, typically, added directly to the hypochlorite-chlorate containing electrolyte exiting the cells whilst maintaining rapid mixing of the solution. Temperatures as low as 60° C. and higher than 90° C. can be used, but the most favourable efficiency of utilization of the hypochlorite has been found to occur between 75° C. and 85° C. The pH of the solution during the reaction preferably should be above approximately 10.5. Lower pH's give lower utilization of hypochlorite and ammonia, and higher pH's are wasteful in the amount of sodium hydroxide addition required. After a reaction period of approximately 30 minutes at 80° C., the excess ammonia is removed from the solution and the pH adjusted to below pH 8.5 (preferably pH 6.5–7.5) acid. During a further period of 30 minutes with agitation at 80° C. the characteristic blue-green mixed valency chromium hydroxide precipitate is formed and is finally removed by filtration. It will be appreciated that the time periods to effect precipitation in stages (a) and (b) will vary depending on the pH and temperature conditions used. However, the skilled man can readily ascertain the optimum values. The above periods are offered by way of guidance.

In a minor modification of the process ammonia and hypochlorite may be reacted in one portion of the produced electrolyte and the resulting solution added to another portion of the electrolyte. However, it has been found that the utilization of hypochlorite is much less efficient in this variation than in the first process which is therefore preferred.

If insufficient hypochlorite is present in the electrolyte to complete the elimination of the dichromate, ammonia and alkali can be added to the electrolyte, followed by the addition of further hypochlorite. All with good agitation. This has been found to be a very efficient method of utilizing hypochlorite.

The amounts of hypochlorite, ammonia and alkali required to achieve complete stripping of chromium from solution depend upon the conditions selected for the sequence of reactions and may be readily determined by the man skilled in the art. Typically, if the reaction is performed at 80° C., the amount of hypochlorite required is twice the amount by weight of the sodium dichromate to be stripped i.e. 5 g/l of sodium hypochlorate for 2.5 g/l of sodium dichromate. The amount of ammonia required to be present is of the order of twice the amount of hypochlorite i.e. 10 g/l of ammonia for 5 g/l of sodium hypochlorite. Provided that there are sufficient amounts of ammonia and hypochlorite to amount for the hexavalent chromium present the process according to the invention as hereinafter defined provides the improved method of dichromate removal. Clearly, slightly sufficient excessive amounts of mmonia and hypochlorite facilitate said processes. Any excess of ammonia above that required for the reaction in the first state, optionally, is recoverable in any ensuing vacuum treatment.

The chlorate-rich solution can be adjusted to a pH greater than 8.5 for the purpose of stage (a) of the process according to the invention by the addition of sufficient inorganic base. Typical inorganic bases include aqueous solutions of sodium hydroxide, potassium hydroxide and mixtures thereof. The particular inorganic base chosen is one that corresponds to the particular alkali metal chlorate solution undergoing chromate removal. For example, when treating a sodium chlorate solution, then it is preferred to employ sodium hydroxide as the inorganic base. The inorganic base is typically an aqueous solution of the inorganic base having a concentration in the range from about 1 to 10 g/l, preferably 4 g/l.

The chlorate-rich solution can be adjusted to below pH 8.5 for the purpose of stage (b) by the addition of sufficient inorganic acid. Any inorganic acid may be employed in the process of this invention which is capable of controlling the pH of the resultant solution in the range from below 8.5 to about 6.0 and which does not act as a reducing agent for the alkali metal chlorate and hexavalent chromium present in the solution. Typical inorganic acids include hydrochloric acid, sulphuric acid and nitric acid. The acid generally has a concentration in the range from about 5% to 75% inorganic acid by weight in aqueous solution.

The precipitated di- and trivalent chromium hydroxide can be separated from the solution after stage (b) has been completed by any suitable solid-liquid separation technique such as by settling, filtering, centrifuging and the like.

Optionally, the di- and trivalent chromium hydroxide precipitate may be oxidized with sodium hypochlorite and the resultant sodium dichromate returned to the brine feed used to make chlorate by electrolysis.

The following examples are presented to illustrate the invention more fully without any intention of limitation thereto.

In these examples, hexavalent chromium was substantially removed from a concentrated aqueous sodium chlorate solution in a two stage process.

EXAMPLE 1

A solution produced in an electrolytic cell for the production of sodium chlorate was obtained directly as it exited the cell at 80° C. The solution contained 400 g/l of sodium chlorate, 100 g/l of sodium chloride, 2.5 g/l of sodium dichromate and 5 g/l of sodium hypochlorite. To this solution was added with rapid mixing sodium hydroxide at a concentration of 4 g/l and ammonia to 20 g/l and a pH of 10.5. The solution was maintained during this embodiment of stage (a) at 80° C. for 30 minutes whilst maintaining agitation. At the end of this time the solution was passed into a vacuum vessel where it was maintained for 30 minutes. After release of the vacuum the pH was adjusted to 7.5 with the addition of a small quantitiy of hydrochloric acid as an embodiment of stage (b).

After a further 30 minutes at 80° C. the solution containing the blue-green precipitate of chromium hydroxides was filtered and the filtrate analysed for chromium which was found to be present at a concentration of less than 0.2 ppm.

EXAMPLE 2

A solution produced similarly to that for example 1 but containing 5 g/l of sodium dichromate and 2.5 g/l of sodium hypochlorite as well as the above quoted amounts of sodium chlorate and sodium chloride was treated for chromium removal by the following procedure.

Ammonia and alkali were added with vigorous agitation to give concentrations of 20 g/l and 4 g/l respectively as an embodiment of stage (a).

Additional sodium hypochlorite was now added, again with vigorous agitation to bring the total concentration to 8 g/l. All the time the temperature of the solution was maintained at 80° C. as a continuation of stage (a). After 30 minutes the solution was vacuum treated, acidified to pH 7.0 and then agitated at 80° C. for a further 30 minutes as stage (b). The blue-green precipitate which was filtered off had an O/Cr ration of 1.36 and the residual solution a chromium content of 0.2 ppm. The precipitate was redissolved in sodium hypochlorite solution and returned to the electrolytic cell.

I claim:
1. A process for the removal of dichromate from a solution containing chlorate, hypochlorite and dichromate ions by the reduction of the hexavalent chromium of said dichromate to mixed di- and trivalent chromium in the form of a hydroxide precipitate which process comprises effecting said reduction in two stages comprising
   (a) adding ammonia to said solution and treating said solution at a pH greater than 8.5 at a temperature of greater than 60° C. with said ammonia to effect production of said hydroxide precipitate; said ammonia and said hypochlorite being present in sufficiently excessive amounts to permit the production of said hydroxide precipitate; and
   (b) adjusting the pH of the resultant solution to below 8.5 at a temperature of greater than 40° C. to effect substantially complete precipitation of said di- and trivalent chromium hydroxide.

2. A process as claimed in claim 1 wherein said solution during stage (a) has a pH greater than 10.5 and a temperature selected from the range 75° C.–85° C., and during stage (b) has a pH selected from the range 6.5–7.5 and a temperature selected from the range 75° C.–85° C.

3. A process as claimed in claim 2 wherein any ammonia remaining in said solution after stage (a) is removed under vacuum prior to stage (b).

4. A process as claimed in claim 3 wherein the pH of the solution in stage (a) is adjusted by the addition of sodium hydroxide and in stage (b) by the addition of hydrochloric acid.

5. A process as claimed in any one of claims 1 to 4 wherein said solution comprising chlorate, hypochlorite and dichromate ions is a solution comprising sodium chlorate and sodium chloride produced by the electrolysis of brine in an electrolytic cell.

* * * * *